Aug. 22, 1967
C. RUSS
3,336,919
IMPLANTED ELECTRODE FOR MEASURING
OXYGEN PRESSURE IN AN ORGAN
Filed Feb. 21, 1964
2 Sheets-Sheet 1
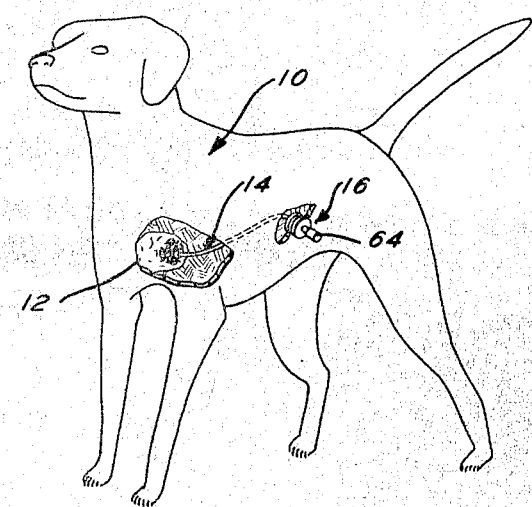
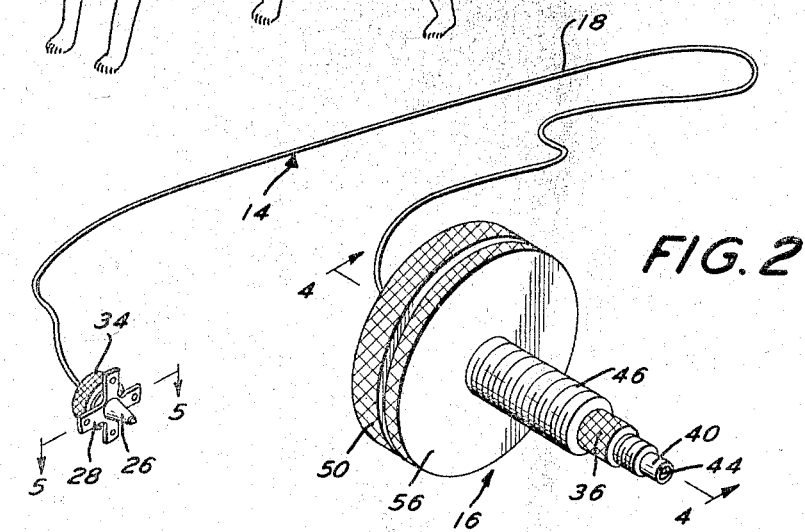
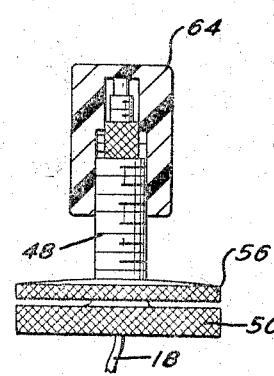
INVENTOR.
CLEM RUSS
BY
Arthur H. Seidel
ATTORNEY

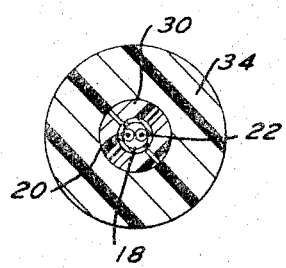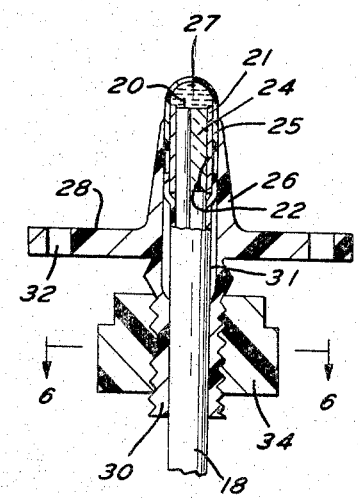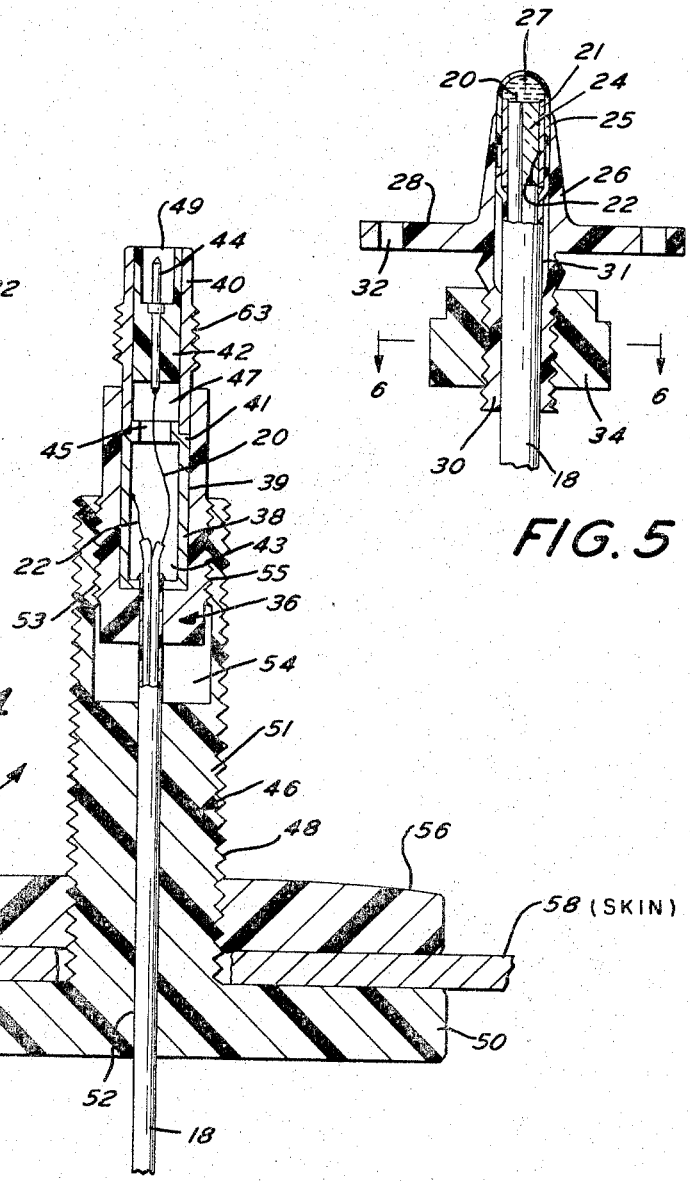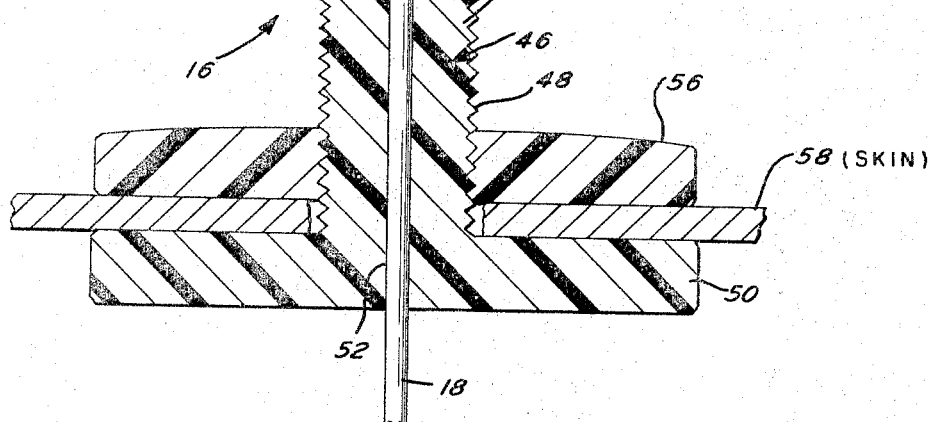

United States Patent Office 3,336,919
Patented Aug. 22, 1967

3,336,919
IMPLANTED ELECTRODE FOR MEASURING OXYGEN PRESSURE IN AN ORGAN
Clem Russ, 6732 Chew Ave., Philadelphia, Pa.
Filed Feb. 21, 1964, Ser. No. 346,505
11 Claims. (Cl. 128—2.1)

This invention relates to an implanted electrode for measuring the oxygen pressure in the tissue of an organ of an animal.

Recently, medical science has become interested in the effects of prolonged hypothermia on such organs as the heart and liver. One method which has been devised for gaining information as to the effect of hypothermia on the heart and liver has been to critically evaluate relative changes in oxygen pressure in the heart and liver during prolonged periods of hypothermia. The evaluation of relative changes in oxygen pressure in organs in situ represents a direct indication of the adequacy of blood circulation to these organs. As is well known, the blood circulation system constitutes the vehicle for delivering oxygen to the tissue of organs in an animal. Hence, oxygen pressure variations within an organ during prolonged periods of hypothermia are on indicator of the amount of blood being circulated during an induced condition of hypothermia.

To date, there has been no adequate means devised for measuring oxygen pressure variations in internal organs in situ. The present invention is directed to means by which such information may be obtained.

The operating principle used in the present invention comprises an electrolytic method for determining variations in oxygen pressure. A pair of metal electrodes, silver and platinum respectively, are immersed within an electrolyte solution, such as potassium chloride. The silver electrode is adapted to act as an anode and the platinum electrode as the cathode in the electrolytic procedure. A thin polyethylene membrane, permeable to gases, but not the electrolyte, surrounds the electrodes and houses the electrolyte in which the electrodes are immersed. A suitable bias may be placed upon the electrodes so that the silver electrode forms the anode and the platinum electrode forms the cathode.

When the above structure is placed in contact with the organ of an animal, oxygen in the organ will permeate through the polyethylene membrane and contact the charged cathode. The oxygen molecules will be reduced forming oxygen ions. To balance the reduction of oxygen at the platinum cathode, atoms in the anode are oxidized. The silver ions formed by oxidation at the anode combine with chloride ions in the electrolyte, forming silver chloride which is deposited on the anode. By the reduction of oxygen at the cathode and oxidation of silver at the anode, a direct current is caused to flow in the electrodes and through the electrolyte. This flow of current will be directly proportional to the rate of oxygen reduction at the cathode. Thus, this current flow, when amplified and read on a meter, will provide a continuous measurement of the amount of oxygen being circulated to the organ in which the above described electrodes can be placed in contact with. Variations in the current flow will indicate variations in oxygen supplied to the organ.

While the theory for measuring oxygen variations as outlined above, is relatively simple, it is much more difficult to combine this theory into a workable apparatus. In designing apparatus for permanent securement to an internal organ of a living animal, the following considerations must be taken into account: (1) means for facilitating penetration of the apparatus into the organ of the animal; (2) means for permanently securing the apparatus to the organ so that movement of the living animal will not effect the implantation of the apparatus into the organ; (3) means accessible to suitable measuring apparatus external of the animal for ready observation of internal changes within the organ with the devices implanted; and (4) a flexible connection between the external observation means in the implanted portion of the apparatus whereby natural movement of the animal under observation will neither hinder the operation of the apparatus nor restrict the natural activities of the subject under observation.

Accordingly, it is the primary object of this invention to disclose apparatus for use in measuring the oxygen pressure in the tissue of an internal organ of an animal in situ.

A further object of this invention includes the use of a pair of metal electrodes immersed within a suitable electrolyte which may be implanted within an organ of an animal in situ for measuring the oxygen pressure in the tissue of said organ.

Still a further object of this invention is to provide an implanted electrode means of the aforementioned character which is generally limp whereby when placed within the body of an animal under observation will neither hinder the natural activity of the animal nor place any strain on the portion of the electrode means which is implanted in the organ.

Another object of this invention resides in the provision of apparatus of the aforementioned character which includes means secured to the skin of the animal under observation which will be readily available at all times for measuring the oxygen pressure in the tissue of an organ of the animal.

Yet another object of this invention resides in the provision of an implanted electrode means of the character indicated which is specially equipped with rigidifying structure at one end thereof for quickly and efficiently effecting penetration of the organ under observation.

Still a further object of this invention comprises apparatus of the character described which may be firmly secured by discrete means to the organ of the animal thereby insuring against accidental removal of the implanted electrode means from the organ.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a perspective view of an animal and illustrating the apparatus for use in measuring the oxygen pressure in the tissue of an organ of said animal secured to the animal's organ at one end and to the skin of the animal at its opposite end.

FIGURE 2 is a perspective view of the apparatus illustrated in FIGURE 1.

FIGURE 3 is a view in side elevation of the portion of the apparatus which is adapted to be connected to the animal's skin and a protective cap therefor shown in section.

FIGURE 4 is a cross sectional view of the apparatus taken substantially along the plane indicated by the line 4—4 of FIGURE 2 and further illustrating the connection of a portion of the apparatus to the skin of the animal under observation.

FIGURE 5 is a cross sectional view taken substantially along the plane indicated by the line 5—5 of FIGURE 2 and illustrating the details of one end of the implanted electrode means.

FIGURE 6 is a cross sectional view taken substantially along the plane indicated by the line 6—6 of FIGURE 5.

FIGURE 7 is a perspective view of a cap which may be used in conjunction with the portion of the apparatus illustrattd in FIGURE 4 for penetrating the skin of the animal when connecting the apparatus to the skin.

Referring to the drawings in detail, the apparatus comprising the present invention is illustrated by way of example in measuring the oxygen pressure in the tissue of the heart 12 of a dog 10.

The apparatus comprises a limp electrode means 14 including a contact support structure 16 at one end thereof which is adapted to be secured to the skin of the dog 10. The opposite end of the electrode means 14 terminates in a generally conical probe 26 which is adapted to be implanted within the heart 12 or other organ of the dog 10 in situ.

The flexible electrode means 14 includes an electrically inert casing 18 which is extremely limp. When used with the present invention the term limp designates a structure which is flexible so that it can be tied in a knot or otherwise bent in any desired manner. The casing 18 may comprise a polyethylene sheath having an outer diameter of approximately .015–.030 inch. A platinum electrode 20 and a silver electrode 22, each of the order of .005 inch in diameter are carried within the casing 18. The electrodes 20 and 22 as can be seen in FIGURES 5 and 6 are electrically insulated from each other within the casing 18.

The casing 18 is connected to the conical probe 26 by passing the casing through a split shank 30 extending rearwardly from the conical probe 26. A knurled collar 34 is threaded onto the split shank 30 and clamps the casing 18 to the conical probe. The casing 18 enters a hollow cavity 31 in the conical probe 26.

A silver sleeve 21 is disposed about the platinum electrode 20 and silver electrode 22. The insulation surrounding the silver electrode 22 is stripped from the electrode, and the electrode 22 is connected to the sleeve 21. The platinum electrode 20 has an exposed tip extending beyond the terminal portion of its surrounding insulating material. Molten glass 24 is poured within the silver sleeve 21 about the end of the silver electrode 22 and rigidifies the tip of the electrode means 14. That is, the silver sleeve 21, the end of the platinum electrode 20, and the end of the silver electrode 22 are rendered integral and rigid by means of the molten glass embedded within the silver sleeve 21. Secured to the silver sleeve 21 is a thin polyethylene membrane 25, permeable to gases. The membrane 25, however, is impervious to liquids and therefore can house an electrolyte solution 27. The tip of the platinum electrode 20 and the silver sleeve 21 are both immersed within the electrolytic solution 27. By way of example only, electrolyte 27 may comprise a solution of potassium chloride.

Integrally connected to the conical probe 26 are four radially outwardly extending flanges 28. Each flange 28 includes a hole 32. By means of these flanges 28 and holes 32, the conical probe 26 containing one end of the electrode means 14 may be sutured to the organ under observation after the conical probe has penetrated into the organ. The conical probe 26, its flanges 28 and the knurled collar 34 may be constructed from an electrically inert plastic such as Teflon.

At its other end, the casing 18 is adapted to be connected to the contact support structure 16. The contact support structure 16 includes a bushing structure 36 formed from polyethylene or the like. A sleeve 40 of a good conducting material is inserted into a socket 39 in the bushing structure 36. A silver sleeve extension 38 is also embedded within the socket 39 and includes an annular shoulder 41 which forms a seat for the sleeve 40. The bushing structure 36, the silver sleeve extension 38, and the conducting sleeve 40 are rendered integral as a unit by any suitable means.

As shown in FIGURE 4, the casing 18 extends through an opening within the bushing structure 36 into the hollow interior 43 of sleeve extension 38. The insulation is stripped from the electrodes 20 and 22. The silver electrode 22 is secured in any suitable manner to the silver sleeve extension 38. The platinum electrode 20 is drawn through a bore 45 in the top portion of the sleeve extension 38 and terminates within the hollow interior 47 of the sleeve 40. A dielectric 42 having cylindrical opening 49 is secured to the walls of the hollow interior 47 of the sleeve 40. A contact element 44 is embedded within the dielectric 42 and has a terminal portion within the opening 49 and a second terminal portion extending beyond the bottom surface of the dielectric 42 into the hollow interior of the sleeve 40. The platinum electrode 20 is connected to the second terminal portion of the contact element 44.

The bushing structure 36 is adapted to be secured to a threaded housing 46 of electrically inert material such as polyethylene. The housing 46 includes an elongated shank 51 externally threaded as shown at 48. The upper end of the shank 51 includes the cavity 54 which is partially threaded as shown at 53. The bushing 36 which has external threads 55 is threadably connected to the housing 46 by threading the threads 55 onto the threads 53 in the cavity 54. An elongated bore 52 extends through the shank 51 and flange 50 of the housing 46 and allows passage of the casing 18 to the bushing structure 36.

The contact support structure 16 is adapted to be secured to the skin 58 of the dog 10. The flange 50 of the housing 46 will lie below the level of skin 58 of the dog 10 and held in tight engagement with the skin by means of a nut 56 threaded upon the external threads 48 on the shank 51.

The apparatus described above is implanted within the dog 10 and operates as follows:

The dog 10 or other animal under observation is first anesthetized and its chest opened in part and exposed using standard surgical procedure. A tiny puncture is then made in the wall of the heart 12. The conical probe 26 is then pushed into this puncture along with the end of the electrode means 14 contained within the conical probe 26. The opening in the organ is approximately 1 mm. in diameter and 1.5 mm. deep. The flanges 28 on the conical probe 26 are then sutured to the organ by sutures placed through the openings 32 in the flanges.

The casing 18 containing the limp electrodes 20 and 22 as well as the contact support structure 16 is disposed entirely within the body of the dog 10 through the surgical wound previously made. A cap 60 internally threaded at 62 and having a sharp point such as 61 is first threaded onto the external threads 48 of the body 46. Casing 18 and contact support structure 16 are then run along the animal just beneath the level of the skin 58. After insuring that sufficient slack has been left in the casing 18 so that it will readily be flexible and limp, the sharpened end of the cap 60 is pushed through the skin 58 of the dog 10 until the flange 50 of the housing 46 abuts the skin level. The cap 60 may then be unthreaded and removed from the threads 48. Since the cap 60 covers the shank 51 and threads 48, the threads and shank will be free of any blood. Nut 56 may then be threaded upon the threads 48 to firmly clamp the flange 50 of the housing 46 of the contact support structure 16 to the skin of the dog 10.

Because of the rigidification of the end of the electrode means 14 by the embedded molten glass 24, the end of the electrode means 14 may be quickly and efficiently pushed into the organ 12. The end of the electrode means 14 extends slightly beyond the end of the conical probe 26. If the electrode means were entirely limp, forceful penetration into the organ 12 could not be readily effected.

With the electrode means 14 and the contact support structure 16 implanted within the organ 12 and skin 58, respectively, the surgical incision may be closed. The apparatus is then ready for use.

A battery is then connected by suitable connectors to the contact support structure 16. The negative terminal of the battery is connected to the contact element 44 to place a negaive bias on the platinum electrode. The positive terminal of the battery can be suitably connected to the threads on the sleeve 40 to positively bias the silver electrode 22. Hence, the silver electrode constitutes an anode and the platinum electrode a cathode in the electrolytic process to be described hereinafter.

As previously noted, the platinum electrode 20 has an exposed tip immersed within the potassium chloride solution 27 within the polyethylene membrane 25. Similarly, the silver electrode is connected to the silver sleeve 21 immersed within the electrolyte 27. Since the polyethylene membrane 25 is permeable to gases, oxygen within the tissue of the heart or other organ 12 will permeate through the membrane 25 into the electrolyte 27. Each oxygen atom is reduced by the platinum cathode to form oxygen ions. To balance the reduction of oxygen at the cathode, atoms in the anode are oxidized and lose an electron. The silver ions, combined with the chloride ions in the electrolyte, form silver chloride which is deposited on the anode. Reduction of the oxygen at the cathode and oxidation of silver at the anode sets up a direct current flowing through the electrolyte 27 and the electrodes 20 and 22. The flow of current is directly proportional to the rate of oxygen reduction at the cathode. Hence, any change in the current flowing through the electrodes 20 and 22 will be indicative of the oxygen and blood circulation within the organ 12.

A suitable electrical amplifying device and a meter may be placed in circuit with the electrodes 22 and 20 to register the conditions just mentioned. In this manner, the oxygen pressure in various organs of an animal may be measured.

When the contact support structure is not in use, the cap 64 may be threaded onto the external threads 48 of the housing 46. This will preclude accidental damage to the contact support structure 16.

It should also be noted that only one electrode, such as the platinum electrode 20 need be carried by the contact support structure 16, the casing 18 and the conical probe 26. The silver electrode 22 may be completely independent and apart from the conical probe 26, casing 18, and contact support structure 16 housing the platinum electrode 20. That is, it is contemplated within the scope of the present invention that the silver electrode may be secured to the polyethylene membrane 25 and immersed within the electrolyte 27, but not run through the casing 18, conical probe 26 and contact support structure 16. In lieu thereof, the silver electrode can be secured to the skin 58 of the dog 10 with a contact support structure such as disclosed at 16, run through a separate casing 18 and secured to the polyethylene membrane 25, and immersed within the electrolyte 27.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for use in measuring oxygen pressure in the tissue of an organ of an animal comprising a housing, a probe, and electrode means having a flexible electrically inert casing connected to the probe and the housing, said electrode means including at least one metal electrode in said casing, said electrode having a tip exposed at said probe, said probe containing an electrolyte contacting said exposed tip, and discrete securing means carried by said probe for securing said probe to an organ of an animal.

2. Apparatus in accordance with claim 1 wherein said securing means includes at least one radially outwardly directed flange, and said probe being rigid.

3. Apparatus in accordance with claim 1 including a support structure, the housing terminating in a threaded structure coupling said electrode to the support structure adapted to be located at the skin of an animal, said housing having at least one electrical contact.

4. Apparatus in accordance with claim 3 wherein said housing has said support structure connected thereto, said support structure being a flange on the housing, and mounting means cooperating with said housing flange for clamping the housing flange to the skin of an animal.

5. Apparatus in accordance with claim 4 wherein said housing includes an elongated portion adapted to extend from said housing flange through the skin of an animal, said portion terminating at a free end having an internally threaded cavity, and the threaded structure being threadedly connected to the threads in said cavity.

6. Apparatus for use in measuring oxygen pressure in the tissue of an organ of an animal comprising an electrode means including a probe, a housing, a limp electrically inert casing connecting the probe to the housing, first and second metal electrodes in said casing and having a tip exposed at one end, said probe including a porous membrane surrounding said exposed end of the electrodes and containing therein an electrolyte in which said electrode ends are immersed.

7. Apparatus in accordance with claim 6 including discrete securing means carried by said probe for securing said probe to an organ of an animal, and discrete securing means carried by said housing for securing said housing to the skin of an animal.

8. Apparatus in accordance with claim 6 including a vitreous body in said membrane thereby rendering said probe rigid to facilitate entrance into an organ of an animal.

9. Apparatus in accordance with claim 6 wherein said membrane is impervious to said electrolyte but permeable to gases.

10. Apparatus in accordance with claim 9 wherein said membrane is polyethylene, one of said electrodes is silver and the other is platinum, said electrolyte is potassium chloride.

11. Apparatus for measuring oxygen pressure in the tissue of an organ of an animal comprising an electrode means having a generally limp electrically inert casing, said means including at least one metal electrode in said casing, a probe forming a part of said means, said probe containing an electrolyte, said electrode having a tip exposed to said electrolyte, discrete securing means carried by said probe for securing said probe to an organ of an animal, said securing means including at least one radially outwardly directed flange, a housing at one end of said means remote from said probe for coupling said one end of said means to the skin of an animal, said housing having at least one electrical contact connected to the electrode, said housing including a flange projecting therefrom, an elongated hollow portion connected to the housing flange and adapted to extend from the housing flange through the skin of an animal, and means cooperating with said housing flange and elongated hollow portion for clamping said housing flange to the skin of an animal, whereby the housing and probe are each adapted to be connected to separate portions of an animal in situ.

References Cited

UNITED STATES PATENTS

| 2,969,058 | 1/1961 | Parton | 128—2.1 |
| 3,089,483 | 5/1963 | Sheatz | 128—2.1 |
| 3,098,813 | 7/1963 | Beeve et al. | 128—2.1 X |

OTHER REFERENCES

"Platinum Microelectrode," by P. D. Harris et al. in Surgery for June 1960, pp. 962–964.

RICHARD A. GAUDET, *Primary Examiner*.

SIMON BRODER, *Examiner*.